(12) United States Patent
Richards

(10) Patent No.: US 7,618,482 B2
(45) Date of Patent: Nov. 17, 2009

(54) OIL TANK FOR DRY SUMP ENGINES

(75) Inventor: Matthew Richards, Birmingham (GB)

(73) Assignee: Aston Martin Lagonda Limited (GB)

( * ) Notice: Subject to any disclaimer, the term of this patent is extended or adjusted under 35 U.S.C. 154(b) by 179 days.

(21) Appl. No.: 11/281,309

(22) Filed: Nov. 17, 2005

(65) Prior Publication Data

US 2006/0124099 A1 Jun. 15, 2006

(51) Int. Cl.
*B01D 19/00* (2006.01)
(52) U.S. Cl. .............................. 96/208; 96/209; 96/212
(58) Field of Classification Search ................. 184/6.9, 184/6.13, 6.8, 6.5, 6.28; 123/196 R, 195 E, 123/196 A; 96/195; 55/329, 337, 348, 410, 55/459.1
See application file for complete search history.

(56) References Cited

U.S. PATENT DOCUMENTS

| | | | |
|---|---|---|---|
| 2,443,875 A | | 6/1948 | Spangenberger |
| 4,957,517 A | * | 9/1990 | Linnert ......................... 96/384 |
| 5,404,730 A | * | 4/1995 | Westermeyer ................ 62/470 |

FOREIGN PATENT DOCUMENTS

FR 2028926 10/1970

| | | |
|---|---|---|
| WO | WO 03/048531 | 6/2003 |
| WO | WO 03/093656 | 11/2003 |

OTHER PUBLICATIONS

Dictionary.com; http://dictionary.reference.com/browse/refrigerant; p. 2.*
Dictionary.com; http://dictionary.reference.com/browse/engine; p. 2.*
Dictionary.com; http://dictionary.reference.com/browse/overflow; p. 2.*
European Search Report dated May 7, 2008, European Application No. 05270085.3, 4 pages.

* cited by examiner

*Primary Examiner*—Stephen K Cronin
*Assistant Examiner*—Keith Coleman
(74) *Attorney, Agent, or Firm*—Dorsey & Whitney LLP

(57) ABSTRACT

An oil tank for a dry sump engine has a housing having an upper region and a lower region in which the oil is contained. The lower region has an oil outlet to feed a pump which supplies oil to the engine. The upper region houses a swirl tube connected to an oil inlet for air to separate from the incoming oil. The upper region includes an air outlet and is provided with two dished baffle plates each shaped to form a collector area which slopes towards the swirl tube in order to reduce droplets of condensation formed in the upper region flowing into the lower region. The wall of the swirl tube is heated by the incoming oil to promote vaporization of droplets of condensation collected in the collector area.

20 Claims, 3 Drawing Sheets

OIL TANK FOR DRY SUMP ENGINES

RELATED APPLICATIONS

This application claims the benefit of the filing date of prior Patent Application No. 0427371.0, filed Dec. 15, 2004, in Great Britain.

FIELD OF THE INVENTION

The present invention relates to an oil tank for a dry sump engine of a motor vehicle, and more particularly to an improved system for reducing condensation in an oil tank.

BACKGROUND AND SUMMARY OF THE INVENTION

Typically, an internal combustion engine with dry sump lubricating system has a feed pump which supplies lubricating oil from an oil tank disposed outside the engine body to the moving parts in the engine. Oil which has dropped down into a crankcase after circulating through the engine is immediately picked up from the crankcase and sent back into the oil tank by means of a return pump. To ensure that the crankcase does not fill with oil, the pumping capacity of the return pump is greater than that of the feed pump. Unfortunately, this means that a quantity of air and other gases is returned to the oil tank together with the returned oil.

FR2028926 describes an oil tank in which a centrifugal de-aerator is housed in the top of the oil tank in order to release the air from the oil before being returned from the bottom of the tank to the engine. The centrifugal de-aerator comprises a non-rotating tube which has a tangentially extending oil inlet whereby the air and oil mixture, which is extracted from the engine by the return pump, flows in a rotating motion around the interior surface of the tube. Hence, the oil flows into the lower region of the tank whereas the air can escape from the tube by an opening located in the top of the tube and then from the oil tank by means of an air outlet.

It is a disadvantage of such an oil tank that when the air leaves the centrifugal de-aerator there is opportunity for condensation to form due to the temperature difference between the interior surface of the centrifugal de-aerator and the interior surface of the tank. The condensate settles inside the tank at the cooler internal walls of the tank and falls to the lower region of the tank. This condensation causes degradation of the oil by reducing its rust protection abilities and its resistance to aging and thus creates oxidation problem in the engine.

The inventors herein have developed an improved oil tank which overcomes or minimises the above disadvantages.

According to the invention there is provided an oil tank for a dry sump engine, the oil tank having a housing having an upper region and a lower region in which the oil is contained, the lower region having an oil outlet and the upper region having an air outlet and housing a swirl tube connected to an oil inlet for air to separate from the incoming oil, wherein the oil tank has in its upper region a condensation trap which is arranged to reduced flow of droplets of condensation from the upper region into the lower region.

Preferably, the condensation trap is arranged to conduct droplets of condensation into contact with the swirl tube to promote vaporisation of the condensation collected.

Conveniently, the condensation trap comprises at least one baffle plate shaped to form a collector area which slopes towards the swirl tube. Each baffle plate may be secured to the swirl tube and the upper region of the tank.

Also preferably, each overflow comprises several apertures.

Preferably, the condensation trap comprises two substantially dished baffle plates spaced apart from each other and arranged in the upper region.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(s)

Figure 1:
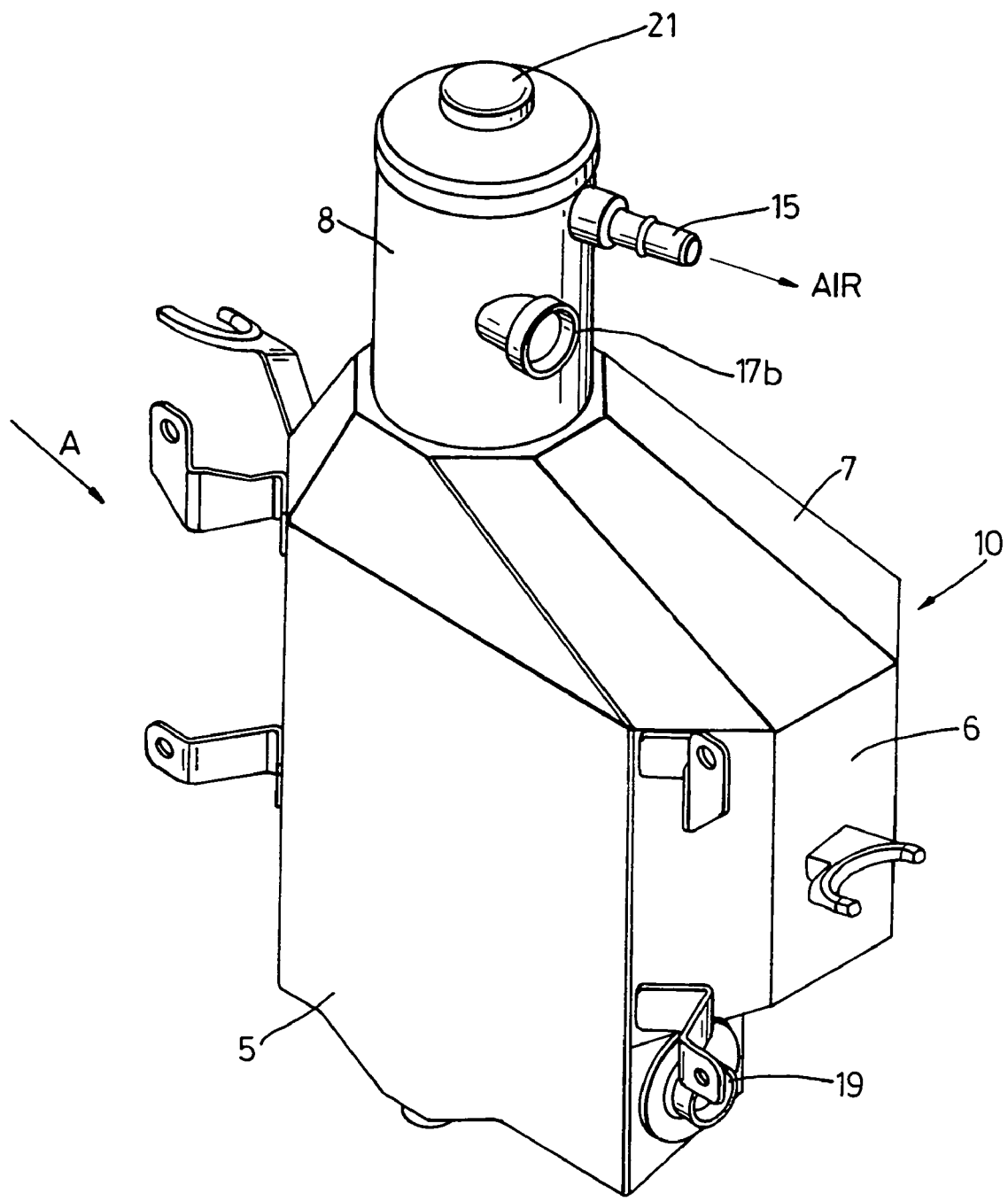
FIG. 1 is a perspective view of an oil tank in accordance with the present invention.
Figure 2:
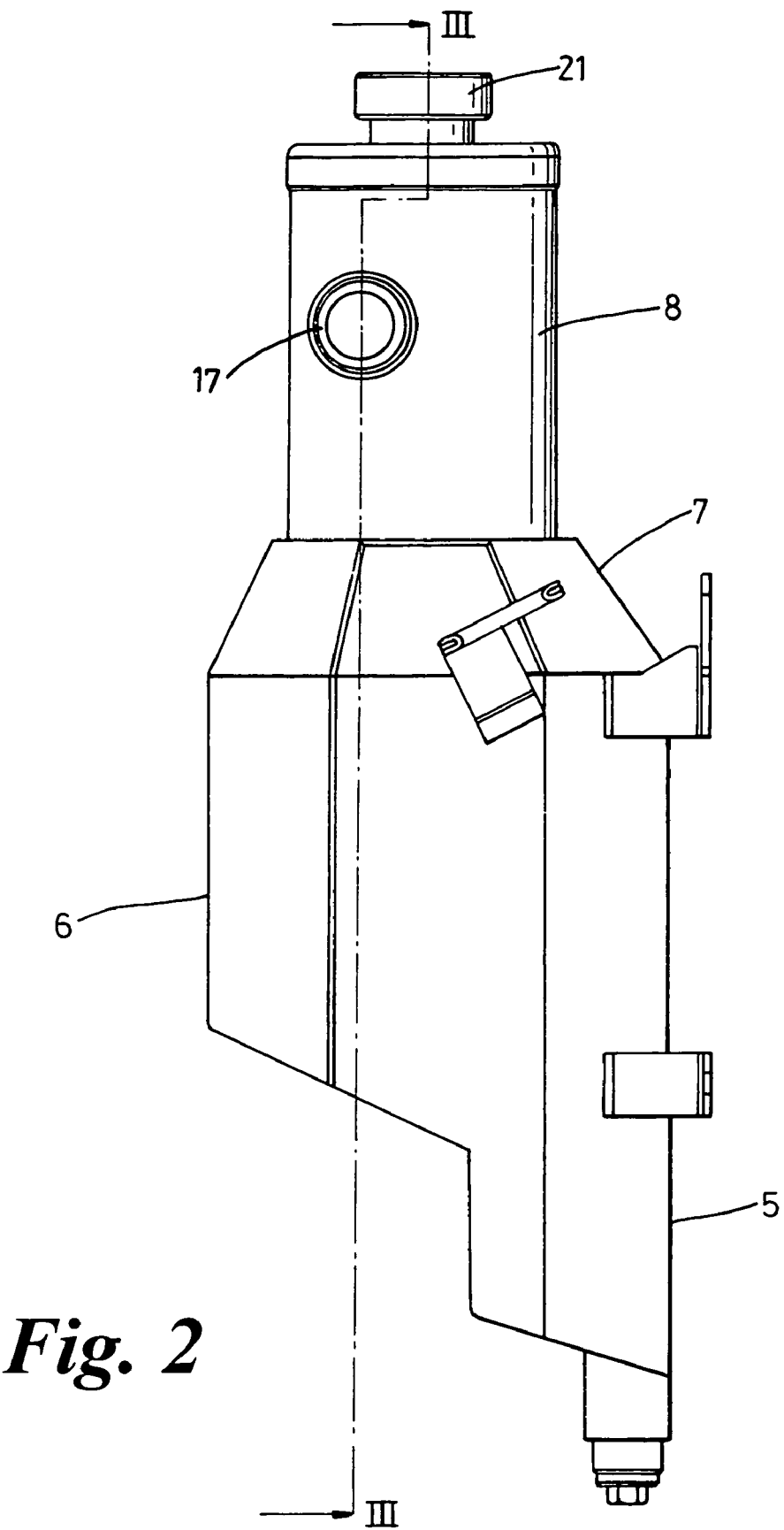
FIG. 2 is a side view in to the direction of arrow A in FIG. 1.

With reference to the drawings, there is shown an oil tank 10 which is formed from metal sheets. The oil tank comprises a tank bottom 5, side walls 6 and a tank lid 7 having a cylindrical neck 8, all together forming a housing 11.

The housing 11 has a baffle plate 12 which defines two substantially upright compartments. These compartments are conveniently referred to as a breather volume, upper region or top compartment 13 and an oil volume, lower region or bottom compartment 14 in the following description. The baffle plate 12 carries a plate gauze oil filter element 23.

The top compartment 13 is provided with an air outlet 15 and a centrifugal de-aerator or gas separator 16. The centrifugal de-aerator 16 comprises a non-rotating upright tube or swirl tube which has a tangentially extending oil inlet 17 in order to give a circular flow to the air and oil mixture entering by way of the inlet 17 into the swirl tube 16. As shown in the drawings, the swirl tube 16 may be provided with a second oil inlet 17b for oil from a cooler by-pass circuit, according the type of engine.

The top end of the tube 16a communicates with the top compartment 13 whereas the bottom end of the tube 16b communicates with the bottom compartment 14 by an extending part of the tube 16 that passes through a hole arranged in the plate 12. It will be appreciated that there is no seal between the tube 16 and the plate 12 so that the top compartment 13 can communicate, through a gap 18 in the plate, with the bottom compartment 14. The bottom compartment 14 is also provided with an oil outlet 19.

Figure 3:
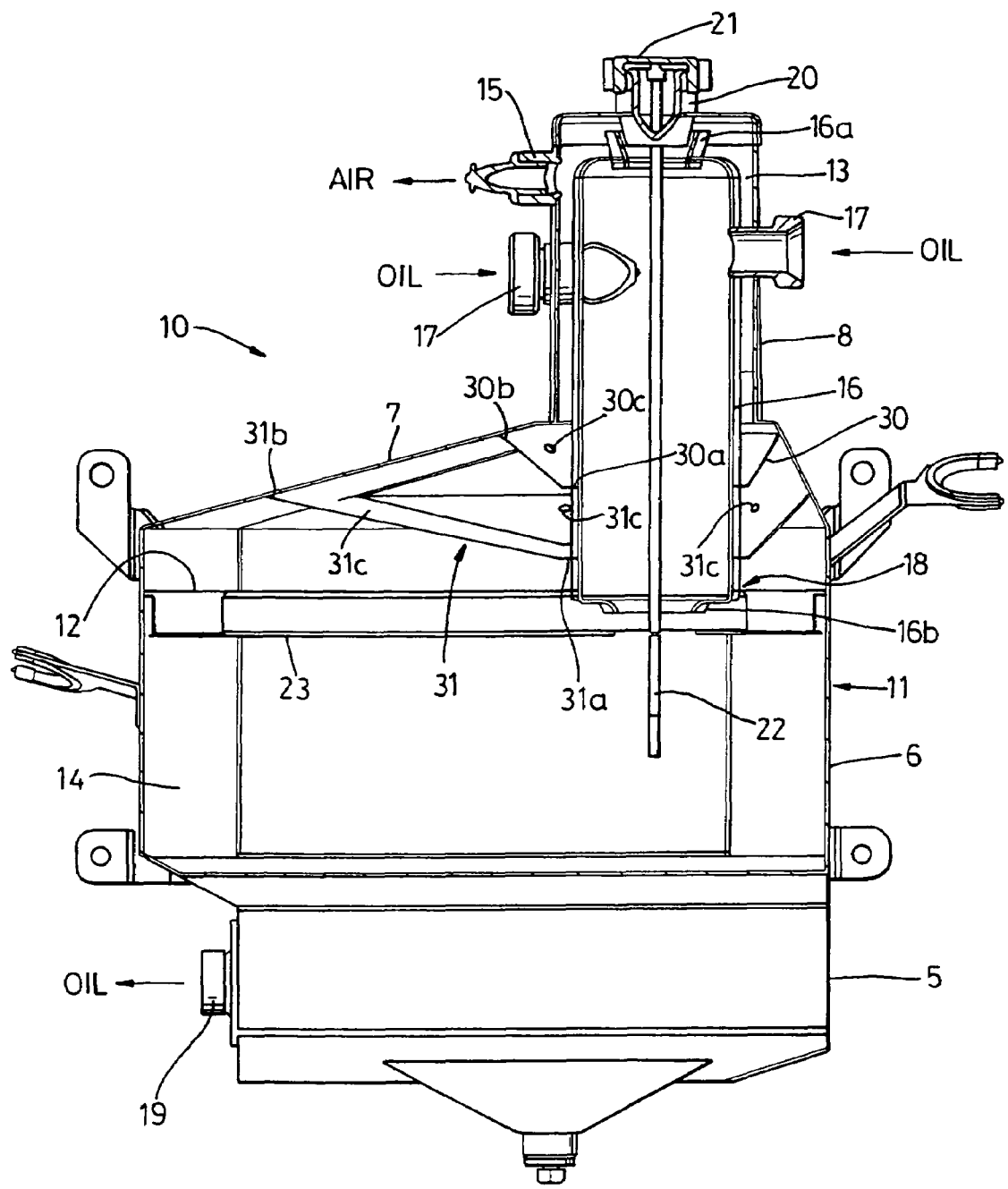
FIG. 3 is a cross-section on the line III-III of FIG. 2.

The cylindrical neck 8 includes an access aperture 20 which is closed in use by a filler cap 21. This access aperture 20 permits the use of a conventional dipstick 22 for a visual determination of the oil level within the bottom compartment 14. It will be seen on the drawing (FIG. 3) that the dipstick 21 passes through the centrifugal de-aerator or swirl tube 16 to reach the bottom compartment 14.

The oil tank 10 as so far described is conventional.

Normally, the tank contains oil in the bottom compartment 14 up to a level between the marks on the dipstick 22. During operation of the engine, oil is drawn from the tank 10 through the oil outlet 19 by a feed pump to lubricate the engine while oil with entrapped air enters the centrifugal de-aerator 16 through the oil inlet 17 and flows in a rotating motion around the interior surface of the swirl tube 16 releasing the air which is allowed to escape out of the top of the tube 16a into the top compartment 13. The air is then returned to the engine via the air outlet 15. The oil then falls into the bottom compartment 14 to be fed back to the engine.

It will be appreciated that when the air reaches the top compartment 13, condensation can be formed due to the reduction in gas velocity and a temperature difference between the interior surface of the swirl tube 16 and the neck 8. Droplets of condensation can then reach the bottom compartment 14 by the passageway 18 between the top compartment 13 and the bottom compartment 14, degrading the oil quality. To overcome this problem, there are two dished-shaped baffle plates 30, 31, spaced apart from each other, provided in the top compartment 13. Each baffle plate 30,31, forming a condensation trap, is substantially V-shaped in cross section and includes a central portion 30a, 31a which is secured around the swirl tube 16 and a peripheral portion 30b, 31b which is secured to the tank lid 7. Thus, each baffle plate 30, 31 forms a collector area for condensation which is funnelled towards the swirl tube 16. Each baffle plate 30, 31 includes several apertures 30c, 31c located towards the outer portion 30b, 31b to act as an overflow preventing each collector area from filling and to allow air and water vapour to escape.

Such an arrangement of baffle plates offers the advantage of catching droplets of condensation and conducting them in to contact with the wall of the swirl tube 16. The hot oil from the engine maintains the wall of the swirl tube 16 at a temperature which is sufficiently high to vaporise the droplets of condensation which can then escape into the top compartment 13 through the holes 30c, 31c and then through the air outlet 15. Hence, most of condensation formed in the oil tank is prevented from reaching the oil, prolonging the life of the oil and, thus, the components of the engine.

The invention claimed is:

1. An oil tank for a dry sump engine, the oil tank having a housing having an upper region and a lower region in which the oil is contained, the lower region having an oil outlet and the upper region having an air outlet and housing a swirl tube connected to an oil inlet for air to separate from the incoming oil, wherein the oil tank has in its upper region outside the swirl tube a condensation trap which is arranged to collect condensation formed in the upper region by at least some of the air separated from the oil by the swirl tube and prevent at least some of the condensation from flowing from the upper region into the lower region, thereby reducing an amount of condensation added to the oil contained in the lower region.

2. An oil tank as claimed in claim 1, wherein the condensation trap is arranged to conduct droplets of condensation into contact with the swirl tube to promote vaporisation of the condensation collected.

3. An oil tank as claimed in claim 2, wherein the condensation trap comprises at least one baffle plate shaped to form a collector area which slopes towards the swirl tube.

4. An oil tank as claimed in claim 3, wherein said at least one baffle plate is secured to the swirl tube and the upper region of the tank.

5. An oil tank as claimed in claim 4, wherein said at least one baffle plate is provided with an overflow.

6. An oil tank as claimed in claim 5, in which said overflow comprises several apertures.

7. An oil tank as claimed in claim 6, wherein the condensation trap comprises two substantially dished baffle plates spaced apart from each other and arranged in the upper region.

8. An oil tank as claimed in claim 1, wherein the condensation trap comprises a non-oil condensation trap arranged to collect non-oil condensation formed in the upper region.

9. An oil tank for a dry sump engine, the oil tank comprising:
a housing including an upper compartment and a lower compartment in which oil is contained;
a centrifugal de-aerator disposed in the upper compartment in communication with an oil inlet to receive an air-oil mixture, in communication with the upper compartment to allow air separated from oil by the de-aerator to exit the de-aerator into the upper compartment, and in communication with the lower compartment to allow oil separated from air to exit the de-aerator into the lower compartment;
a condensation trap disposed in the upper compartment outside the de-aerator and configured to collect condensation formed in the upper compartment by at least some of the air separated from oil by the de-aerator.

10. An oil tank as claimed in claim 9, wherein the upper compartment is in communication with the lower compartment and the condensation trap is configured to prevent at least some of the condensation from flowing into the lower compartment.

11. An oil tank as claimed in claim 9, wherein the de-aerator comprises a swirl tube and the condensation trap comprises at least one baffle plate configured to guide the condensation into contact with an external surface of the swirl tube.

12. An oil tank as claimed in claim 11, wherein the external surface of the swirl tube is configured to conduct heat from at least the oil of the air-oil mixture to vaporize at least part of the condensation guided into contact with the external surface.

13. An oil tank as claimed in claim 11, wherein the at least one baffle plate comprises a plurality of spaced-apart baffle plates, at least an upper one of the baffle plates including at least one aperture.

14. An oil tank as claimed in claim 11, wherein the at least one baffle plate is secured to the upper compartment and to the external surface of the swirl tube.

15. An oil tank as claimed in claim 11, wherein the at least one baffle plate is sloped toward the external surface of the swirl tube.

16. A method of reducing an amount of condensation, formed in an upper compartment of an oil tank for a dry sump engine, added to oil contained in a lower compartment of the oil tank, the method comprising:
introducing an air-oil mixture into a de-aerator disposed in the upper compartment;
separating air from oil using the de-aerator;
allowing the separated air to exit the de-aerator into the upper compartment;
collecting condensation formed in the upper compartment by at least part of the separated air from the de-aerator using a condensation trap disposed in the upper compartment; and
preventing at least some of the collected condensation from flowing from the upper compartment to the lower compartment, thereby reducing an amount of condensation added to the oil contained in the lower compartment.

17. The method of claim 16, wherein collecting the condensation comprises collecting condensation using at least one baffle plate.

18. The method of claim 16, further comprising guiding at least part of the collected condensation into contact with an external surface of the de-aerator.

19. The method of claim 18, further comprising vaporizing at least part of the condensation guided into contact with the external surface of the de-aerator.

20. The method of claim 19, wherein vaporizing at least part of the condensation guided into contact with the external surface of the de-aerator comprises conducting heat from at least the oil of the air-oil mixture to the external surface of the de-aerator.

* * * * *